May 28, 1940.   J. R. J. VAN DONGEN ET AL   2,202,071
APPARATUS FOR CONTACTING VAPORS AND LIQUIDS
Filed Nov. 25, 1938
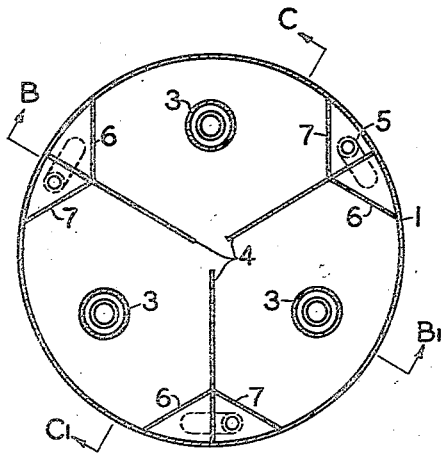
Fig. I
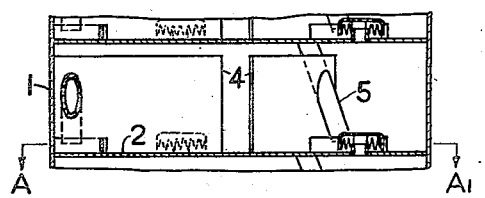
Fig. 2
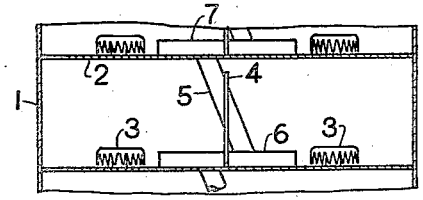
Fig. 3
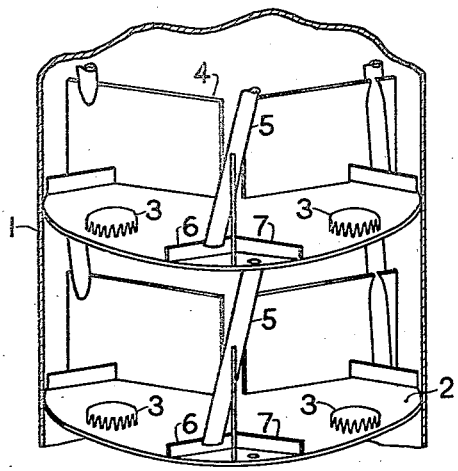
Fig. 4
Inventors:
Jan Roelof Johan van Dongen
Willem Johannes Dominicus van Dijck
By their Attorney:

Patented May 28, 1940

2,202,071

UNITED STATES PATENT OFFICE 2,202,071

APPARATUS FOR CONTACTING VAPORS AND LIQUIDS

Jan Roelof Johan van Dongen, Emmastad, Curacao, Dutch West Indies, and Willem Johannes Dominicus van Dijck, The Hague, Netherlands, assignors to Shell Development Company, San Francisco, Calif., a corporation of Delaware Application November 25, 1938, Serial No. 242,356
In the Netherlands November 29, 1937

1 Claim. (Cl. 261—114)

The object of the present invention is to provide an improved contact plate and column containing plates or trays for contacting liquids with gases or vapors which is free from inherent defects common to such apparatus in the past.

The invention also provides a new and improved apparatus for flowing liquids in contact with vapors in such operations as absorption, fractional distillation, etc. The apparatus of this invention is suited for contacting any vapors or gases with organic or inorganic liquids, as in the absorption or scrubbing of natural or industrial gases, fractional distillation of inorganic or organic liquid mixtures, etc.

With some of the contacting apparatus heretofore used, it frequently occurs that the liquid on successive trays moves in opposite, or at least different, directions. In such apparatus the composition of the liquid on successive trays at points in vertical alignment is not uniformly graduated, except at a point in the exact center of the column. Thus, vapors rising through the column do not ordinarily meet with successive liquid streams of uniformly graduated composition, but rather encounter two successive streams of almost identical composition followed by contact with a stream of greatly different composition. This is the result of the liquid being forced to flow in a zig-zag course as it descends through the column.

It has been proposed to remedy this defect by the use of inclined down-flow pipes which pass the overflow liquid from one tray to the next lower tray at the opposite side of the column. These inclined down-flow pipes greatly impede the flow of liquid because of their low pitch. Further disadvantages are that if the pipes are placed inside the column they interfere with the flow of rising vapors, while if placed outside they allow serious heat losses unless well insulated.

It has also been proposed to shut off the central portion of the column by a tubular vertical member, and to place the feed and discharge of each tray adjacent to one another, separated by a baffle. With this arrangement, the liquid must flow completely around each plate before descending to the next lower plate; this has the obvious disadvantage of reducing the effective plate area of the column. A similar plan calls for the use of a partition which divides each plate into two sections. Each section is provided with feed and discharge pipes located on opposite sides of the section; the liquid stream is divided into two portions, and only half the stream flows through each section. In descending, the liquid streams follow parallel paths, flowing first through a section on one plate and then, after an abrupt reversal and not gradual change of direction, through the opposite section on the next lower plate. The two above proposals, although they secure the desired parallel flow of liquid, have other disadvantages. Thus, since the path of flow on each plate or section is relatively long, the flow of liquid is sluggish, which results in a reduced capacity for the column. The liquid flow can be increased by having a substantial hydraulic head across the plate; however, this is disadvantageous, as the rising vapors will pass through the plates at the points of least resistance, resulting in channelling.

According to the present invention, the vapor and liquid are contacted on a plate designed to maintain at least three separate, substantially equal, liquid streams with the vapor passing through in a uniform direct contact with said streams. A series of these superposed plates are arranged in a column so that, with the vapors rising along substantially vertical, generally straight line paths, at least three parallel liquid streams descend along gradual helical paths through the column.

One of the advantages of this invention is that a rapid flow is secured without the use of a large liquid head on the plates, resulting in a uniform distribution of vapors passing through; the advantage of dividing a plate into from three to five substantially sector-shaped sections results, in addition, in a more favorable flow of liquid across the plate than the flow obtained with less or more sections, the reason apparently being in the plan shape of each section. Further, the entire area of the column is utilized, and the down-flow pipes are substantially vertical and are inside the column. The particular manner of flowing several equal liquid streams through the column along gradual helical paths results in a more uniform, steady and more balanced operation than is attainable with known methods and equipment.

In carrying out this invention in practice, each tray, provided with vapor-liquid contact means, is divided into three or more, preferably not more than five, and still better, only three, sections by converging, substantially radially disposed baffles. The descending liquid, such as reflux, is divided into a corresponding number of streams, one of which is directed into each section of a tray. A down-flow conduit is provided from each section of each tray to a similar section of the next lower tray, so that descending liquid follows several generally parallel, gradually helical courses.

In this way, the liquid flows only a third or less of the way around the perimeter of the column on each tray. Thus, for a given speed of flow, the necessary hydraulic head is much smaller than in the previously mentioned columns where the liquid flows entirely or half of the way around the column on each plate.

Although three to five are the preferred numbers of sections, the trays may be built with more than five sections, but an increased number of sections adds to the expense of the column without proportionately increasing its efficiency. Another disadvantage of the division into more than five sections lies in the fact that as the tray is further divided, the sections approach the shape of an isosceles triangle of very small base, with the feed and discharge being located at either side of the base. This causes a stagnation of liquid at the vertex of the triangle so formed (center of the column), which decreases the efficiency of the column. This appears to be the reason for the optimum operation being obtained when the tray is divided into three to five sections. This shape makes the most efficient column, as no space is wasted at the center, either by stagnation of liquid, or by closing off a section of the column. A further advantage lies in the gradual helical course of the liquid. For a more detailed description of the invention, reference is now had to the attached drawing in which:

Fig. 1 is a plan view on the line A—A' of Fig. 2 of a plate divided into three sections.

Fig. 2 is a cross section on the lines B—B' of Fig. 1 showing two plates of the three-section column.

Fig. 3 is a cross section of the same column on the lines C—C' of Fig. 1.

Fig. 4 is a cut-away perspective view of the same column.

In each of these figures, 1 designates the shell of the column, 2 are contact plates provided with bubble caps 3, of which only one has been indicated in each section, or other means for contacting liquid and vapor, 4 are radial baffles on the plates arranged to form sector-shaped sections for maintaining separate liquid pools on the sections of each plate, 5 are liquid conduit means, such as pipes, for passing the over-flowing liquid from each plate section to a similar section on the next lower plate. A weir 6 is provided in each plate section to form with baffles 4 and the shell of the column a liquid feed zone or compartment surrounding the lower end of the down-flow conduits for maintaining a liquid seal therein. An overflow weir 7 positioned near the upper end of each down-flow conduit 5, which end is flush with the plate, as shown, forms a liquid discharge zone and serves as a dam for maintaining a certain liquid depth on each plate. The space between the weirs 7 and 8 forms a vapor-fluid contact zone. The weirs are unnecessary when the down-flow conduits extend above the plate bottom, thus causing the liquid to accumulate on the plate to a certain level before overflowing to the next plate below.

The radial baffles which divide the column plates into sector-shaped sections may or may not completely separate interplate spaces within the column into entirely enclosed sections. The most efficient operation results when the sections of one plate are in restricted liquid communication and free vapor communication with each other. To achieve this, a small opening may be left between the baffles 4 at the center of the column, as shown on all figures, which is sufficient to allow the liquid to flow from one section to another and to equalize the depth of liquid in each section, but small enough to allow the sections to operate substantially independently by confining the substantial bulk or all of the liquid supplied to one section to that particular section. The baffles are constructed only as high as, or slightly above, the normal liquid level to maintain the sections of the same plate in vapor communication with each other to equalize the pressure.

The improved column of this invention operates as follows: At the top of the column 1, liquid, such as reflux, is divided into a number of streams corresponding to the number of sections into which the top plate 2 is divided by baffle means 4, and one stream is introduced into each section. Each stream then flows across a section of the plate into the compartment made by overflow weir 7, and then descends by means of down-flow conduit 5 to the liquid seal compartment made by weir 6, and flowing over weir 6 passes to an adjacent or horizontally offset section of the next lower plate, and continuing in the same circular direction flows across that section, and so on. The streams on the various sections and on the various plates flow in the same circular direction, but it is obvious that it is immaterial whether their direction be clockwise or counterclockwise. At the bottom of the column, the streams are collected and removed from the column by suitable means not shown in the drawing. Gases or vapors are introduced at the bottom or an intermediate point of the column to secure a counter-current flow. They flow through the vapor-liquid contact means 3 of the plates, and, after having passed through the column and having been brought into intimate contact with the liquid, are removed. In fractionating, no liquid would ordinarily be introduced at the top of the column, but the operation would be substantially the same, as condensed vapors would descend the column as described above.

Beside the main baffles which separate the various trays into sections, other baffles may be introduced on the trays to direct the liquid flow to certain portions of the trays, and to insure that all portions of the tray receive equal portions of liquid. However, due to the efficient operation of the described type of column, such baffles are ordinarily neither necessary nor particularly desirable.

Although this invention is best adapted for use with columns of circular cross section, it is also applicable to columns of other shapes, e. g., square, rectangular, triangular, hexagonal, etc.

In the drawing and description it has been assumed that the baffles on the various trays are in vertical alignment. This is not necessary, as the baffles on each tray may well be put in offset relationship to those on the adjacent trays; in this way, the down-flow pipes may be placed vertically.

In the specification and claim where the term "vapor" is used, it is understood that gases are included.

We claim as our invention:

In a column for contacting liquids with vapors, a shell having a substantially circular cross section and containing a series of superposed contact plates, three substantially radially disposed baffles on the upper faces of each of said plates dividing each plate into three sectors of substantially equal size, the outer ends of said baffles being contiguous with the shell and the inner ends of the baffles being spaced apart centrally of the contact plates to permit a restricted liquid communication between the three sectors, each sector being provided with a pair of weirs, one weir extending from the shell to one baffle, and the other weir extending from the shell to the other baffle, thereby dividing each sector into a liquid feed zone, a vapor-liquid contact zone, and a liquid discharge zone, vapor passages in each of said sectors for passing vapors through the plates from immediately below the respective sector, and liquid supply means disposed to discharge liquid from the liquid discharge zones of an upper contact plate to liquid feed zones of a lower contact plate, said supply means being arranged to cause three streams of liquid to traverse the column in the same generally spiral direction.

JAN ROELOF JOHAN van DONGEN.
WILLEM JOHANNES DOMINICUS van DIJCK.